United States Patent Office 3,280,219
Patented Oct. 18, 1966

3,280,219
STYRENE - ACRYLONITRILE COPOLYMERS BLENDED WITH GRAFT COPOLYMERS OF STYRENE ONTO BUTADIENE-ALKYL ACRYLATE-VINYL ALKYL ETHER TERPOLYMERS
Hans Peter Siebel, Limburgerhof, Pfalz, and Hans-Werner Otto, Ludwigshafen (Rhine), Germany, assignors to Badische Anilin- & Soda-Fabrik Aktiengesellschaft, Ludwigshafen (Rhine), Germany
No Drawing. Filed Mar. 3, 1964, Ser. No. 349,164
Claims priority, application Germany, Mar. 9, 1963, B 71,062
2 Claims. (Cl. 260—876)

This invention relates to a process for the production of impact-resistant thermoplastic molding material which is distinguished by good resistance to aging, high surface gloss of injection moldings prepared therefrom and a light natural color, combined with good physical properties and processability.

Many impact-resistant molding materials and methods for making them are known. These molding materials are generally mixtures or copolymers of monomers which form hard and brittle polymers and monomers having relatively low second order transition temperatures which are less than 20° C. and preferably below 0° C.

Impact-resistant polystyrene may be prepared by polymerizing styrene in the presence of a rubber component or elastomeric polymers, or by mixing polystyrene with natural or synthetic rubber. Impact-resistant polymers are thus obtained which do not exhibit satisfactory surface hardness for all applications. For this reason, mixtures of styrene and acrylonitrile have already been polymerized in the presence of elastomeric polymers. In this way the surface hardness is improved and at the same time an improvement in solvent resistance and resistance to weathering is achieved.

Copolymers of styrene and acrylonitrile are also known which although completely transparent are not impact-resistant.

Polymers or copolymers or polymer compositions which are impact-resistant and at the same time resistant to aging are also obtained by mixing a component which is elastomeric at room temperature and which is slightly crosslinked, with a homopolymer or copolymer of monomers which when polymerized alone form hard and brittle polymers or by polymerizing the monomers which form the hard component in the presence of an elastomeric polymer which is slightly crosslinked or which crosslinks under the reaction conditions. It is also possible to obtain impact-resistant thermoplastic molding materials which at the same time are resistant to aging by mixing a hard and brittle polymer with a polymer which is elastomeric at room temperature, so that functional groups which are present in the polymers and which are capable of reacting with each other with the formation of main valences, enter into the said reaction. Intermolecular crosslinking of the hard component with the soft component occurs in these compositions. In the said prior art method, it is preferred to use as the soft component one which contains only a very small number of diene units or none at all.

Although impact-resistant molding materials which are very interesting industrially are obtained by the said prior art method, they have certain disadvantages which limit their usefulness. In practice, the surface properties must meet certain requirements as regards hardness, homogeneity and gloss and the material must at the same time have good resistance to aging, i.e., to the effects of heat, oxygen, light and climatic variations.

We have found that impact-resistant thermoplastic molding materials having outstanding physical and optical properties are obtained by (a) Preparing a copolymer I from:
(A) 30 to 77% by weight of butyl acrylate and/or ethylhexyl acrylate;
(B) 20 to 40% by weight of butadiene; and
(C) 3 to 30% by weight of a vinyl alkyl ether having one to eight carbon atoms in the alkyl radical, (the sum of the percentage being 100) by polymerization of the monomers in aqueous emulsion;

(b) Adding 10 to 50% by weight (with reference to the copolymer I) of the styrene or a mixture of styrene and acrylonitrile containing up to 30% by weight of acrylonitrile and polymerizing the resultant mixture in emulsion to form component II; and (c) Mixing component II with a copolymer III of styrene and acrylonitrile in the weight ratio of from 60:40 to 90:10 so that 10 to 35% by weight (with reference to the solids content of the total composition) of component I is contained in the resultant composition.

In the process according to this invention a copolymer I is first prepared by polymerization of certain monomers in aqueous emulsion. The comonomers which form the copolymer I are (A) butyl acrylate and/or ethylhexyl acrylate, used in an amount of 30 to 77% by weight, (B) butadiene amounting to 20 to 40%, preferably 30 to 35%, by weight of the comonomers, and (C) one or more vinyl alkyl ethers which participate to the extent of 3 to 30%, preferably 5 to 20%, by weight in the formation of the copolymer I. The copolymer I is formed by polymerization of the monomers by a conventional method in aqueous emulsion. Conventional emulsifiers, such as sodium salts of paraffinsulfonic acids having twelve to eighteen carbon atoms, arylsulfonates, sodium salts of fatty acids having about sixteen to eighteen carbon atoms, fatty alcohol sulfates having about twelve to eighteen carbon atoms and similar emulsifiers are used in amounts of from about 0.1 to about 3% by weight, and in general free radical forming compounds, such as persulfates, peroxides or hydroperoxides, or also azo compounds are used as polymerization initiators.

The use of vinyl alkyl ethers, preferably of vinyl methyl ethers, in the production of copolymer I is of particular importance. It has been found that a rubber formed from butyl acrylate, butadiene and for example vinyl methyl ether by polymerization in emulsion with water-soluble initiators can be polymerized to high conversions without appreciable crosslinking. This provides the possibility for this originally practically uncrosslinked rubber to be crosslinked in a further stage of the process, for example by adding peroxides, for example benzoyl peroxide, lauroyl peroxide or di-tertiary butyl peroxide, or thermally at elevated temperature. It is also possible first to graft styrene and if desired acrylonitrile onto the practically uncrosslinked rubber and then to effect further crosslinking. By carrying out the reaction appropriately it is also possible to produce a certain degree of crosslinking during the polymerization of copolymer II.

Styrene or if desired a mixture of styrene and acrylonitrile containing up to 30% by weight of acrylonitrile is then polymerized onto copolymer I in aqueous emulsion. Normally styrene and acrylonitrile (when used) are added to the dispersion of the copolymer I, and it may be advantageous to add further emulsifier or polymerization initiator. The polymerization initiator used in this second polymerization stage is preferably soluble in the monomers, i.e. in styrene and acrylonitrile, such as organic peroxides and azo compounds, for example benzoyl peroxide, lauroyl peroxide or azodiisobutyrodinitrile. It is often advantageous also to use small amounts of water-soluble polymerization initiators in the second stage of the process.

The amount of emulsifier in the first polymerization stage for the production of copolymer I is advantageously chosen from the start so that it is not necessary to add further emulsifiers for the polymerization of styrene and if desired acrylonitrile onto the copolymer I. Styrene and acrylonitrile (when used) are polymerized onto the copolymer I in amounts of 10 to 50% by weight with reference to the copolymer I. This relatively wide range is a consequence of the possibilities of variation in the process. The amunot of styrene and acrylonitrile and to a certain extent also the ratio in the mixture of styrene and acrylonitrile are dependent inter alia on the quantitative composition of the copolymer I. The degree of grafting, i.e. the degree in which styrene and acrylonitrile (when used) are grafted onto the preformed copolymer I, may however also be affected by the range of amounts in which styrene and acrylonitrile (when used) are polymerized on, together with the other reaction conditions, such as temperature and the like. The said range of amounts is however also dependent on the third stage of the process which will now be described.

The component II, which has been formed by polymerizing on and grafting styrene and acrylonitrile onto the copolymer I is mixed according to this invention with a copolymer III of styrene and acrylonitrile and the ratio of styrene to acrylonitrile may be 60:40 to 90:10. Mixing of component II with copolymer III may be carried out by various methods. A preferred embodiment consists in adding an aqueous dispersion of component II to a suspension in methanol of copolymer III. Particularly effective mixing of the polymers is thus achieved.

It is also possible to mix an aqueous dispersion of component II with an aqueous dispersion of copolymer III and to precipitate the combined dispersion together or to work them up by drying.

The polymers may also be mixed together in the form of powders in an extruder or on mixing rolls.

The proportions in which copolymer III of styrene and acrylonitrile is mixed with component II are variable and depend on the process of production of component II. To achieve molding materials of high quality which exhibit the properties described above it is essential that from 10 to 35% by weight of the elastomeric component I is contained in the total composition.

Impact-resistant thermoplastic molding materials prepared according to this invention using vinyl alkyl ethers are distinguished by only slight natural color, high surface gloss of injection moldings prepared therefrom, good resistance to ageing and excellent flow properties.

The following examples will further illustrate the invention. The parts specified in the examples are parts by weight.

EXAMPLE 1

Polymer I 5 parts of vinyl methyl ether, 10 parts of butyl acrylate and 25 parts of butadiene are heated to 65° C. while stirring in 145 parts of water with an addition of 1.2 parts of the sodium salt of a paraffinsulfonic acid ($C_{12}$ to $C_{18}$), 0.35 part of potassium persulfate, 0.3 part of sodium bicarbonate and 0.15 part of sodium pyrophosphate. After the polymerization has commenced, a mixture of 55 parts of butyl acrylate and 25 parts of butadiene is added within five hours. After all the monomers have been added, the polymerization mixture is kept at 65° C. for another two hours. An about 40% aqueous polymer dispersion is obtained.

Polymer II 250 parts of the dispersion of polymer I is mixed with 25 parts of a mixture of styrene and acrylonitrile in the ratio by weight of 75:25 and 37.5 parts of water and polymerized at 70° C. while stirring. The polymerization initiator used is 0.5 part of potassium persulfate and 0.75 part of lauroyl peroxide which have been dissolved in a mixture of styrene and acrylonitrile. An aqueous about 40% polymer dispersion is obtained.

Polymer III 250 parts of the aqueous dispersion of polymer II and 400 parts of a copolymer of styrene and acrylonitrile in the ratio by weight of 75:25 which is suspended in 750 parts of methanol are precipitated together. The solid product obtained is separated, dried and processed in a screw extruder. Moldings prepared from this material have excellent gloss and good scratch resistance. The product has the following properties:

| | |
|---|---:|
| Impact strength (DIN) 53,453 more than _____ cm. kg./sq. cm__ | 100 |
| Notched impact strength (molded test specimen) _____ cm. kg./sq. cm_ | 10–20 |
| Module of elasticity _____ kg./sq. cm__ | 25,200 |
| Tensile strength _____ kg./sq. cm__ | 470 |
| Elongation at break, percent _____ | 10 to 19 |
| Ball indentation hardness _____ kg./sq. cm__ | 890 |
| Softening point _____ ° C__ | 101 |

EXAMPLE 2

Polymer I 10 parts of vinyl methyl ether, 10 parts of butyl acrylate and 5 parts of butadiene are heated to 65° C. in 150 parts of water with an addition of 1.2 parts of the sodium salt of a paraffinsulfonic acid ($C_{12}$ to $C_{18}$), 0.3 part of potassium persulfate, 0.3 part of sodium bicarbonate and 0.15 part of sodium pyrophosphate while stirring. After the polymerization has commenced, a mixture of 50 parts of butyl acrylate and 25 parts of butadiene is added within five hours. After all the monomers have been added, the mixture is kept at 65° C. for another two hours. An about 40% aqueous polymer dispersion is obtained.

Polymer II 187.5 parts of the dispersion of polymer I, 18.5 parts of styrene and 6.5 parts of acrylonitrile, 0.10 part of azodiisobutyrodinitrile, 0.1 part of potassium persulfate and 37.5 parts of water are polymerized at 62° C. while stirring. An aqueous about 40% polymer dispersion is obtained.

Polymer III 830 parts of the dispersion of polymer II is precipitated together with 670 parts of a copolymer of styrene and acrylonitrile in the ratio 75:25 which is suspended in 1400 parts of methanol. The solid product obtained is separated, dried and prepared for processing with a screw extruder. The product has the following properties:

| | |
|---|---:|
| Impact strength (DIN 53,453) more than _____cm. kg./sq. cm.__ | 100 |
| Notched impact strength (molded test specimen) _____cm. kg./sq. cm.__ | 10–20 |
| Softening point _____° C.__ | 99 |

EXAMPLE 3

Polymer I

Polymer I is prepared as in Example 2.

Polymer II

Polymerization of a mixture of styrene and acrylonitrile onto the dispersion I is carried out as in Example 2.

The resultant about 40% dispersion is precipitated with a 1.5% calcium chloride solution and the precipitated product is separated and dried.

Polymer III

Polymer II is mixed in a screw extruder at a temperature of about 220° C. in various ratios (see the following table) with a copolymer of 75 parts of styrene and 25 parts of acrylonitrile having a K-value of 63.

TABLE

| Extruder mixture: | | | | | |
|---|---|---|---|---|---|
| Parts of polymer II | 18.75 | 23.45 | 26.80 | 30.15 | 33.50 |
| Parts of styrene-acrylonitrile copolymer | 81.25 | 76.55 | 73.20 | 69.85 | 66.50 |
| Proportion of polymer I in the composition in percent | 14.0 | 17.5 | 20.0 | 22.5 | 25.0 |
| Modulus of elasticity, kg./sq. cm. | 25,100 | 22,000 | 20,300 | 18,500 | 16,600 |
| Notched impact strength, cm. kg./sq. cm. | 5.3 | 12.0 | 13.8 | 17.3 | 25.2 |
| Softening point,° C | 100 | 100 | 99 | 98 | 96 |

EXAMPLE 4

*Polymer I*

Polymer I has the same composition and is prepared in the same way as in Example 1.

*Polymer II*

The aqueous dispersion of polymer I has different amounts of a mixture of styrene and acrylonitrile in the ratio 75:25 (see the following table) polymerized onto it at a temperature of 65° C. The dry content of the dispersion polymerized on is adjusted to 40% by adding appropriate amounts of water prior to the polymerization. The catalyst used is 0.2% of potassium persulfate and 0.3% of lauroyl peroxide (with reference to the amount of styrene and acrylonitrile). The dispersion obtained is precipitated with twice its volume of a 1.5% solution of calcium chloride and the solid product is separated and dried.

*Polymer III*

Polymer III is prepared by mixing appropriate amounts (see the Table) of polymer II with a copolymer of styrene and acrylonitrile (ratio 75:25) having a K-value of 68 to 70, at a temperature of 220° C. in a screw extruder.

TABLE

| Percent of styrene and acrylonitrile polymerized on to polymer I | 10 | 20 | 30 | 40 | 50 |
|---|---|---|---|---|---|
| Parts of polymer II in extruder mixture | 26.7 | 26.8 | 26.8 | 26.7 | 26.7 |
| Parts of copolymer of styrene and acrylonitrile in the extruder mixture | 73.3 | 73.2 | 73.2 | 73.3 | 73.3 |
| Proportion of polymer I in polymer II in percent | 24.3 | 22.3 | 20.6 | 19.1 | 17.8 |
| Notched impact strength, cm. kg./sq. cm. | 26.3 | 28.8 | 8.0 | 2.5 | 2.4 |
| Softening point,° C | 96 | 98 | 98 | 99 | 99 |

EXAMPLE 5

*Polymer I*

10 parts of vinyl methyl ether, 10 parts of butyl acrylate and 8 parts of butadiene are heated to 65° C. while stirring in 150 parts of water with an addition of 1.2 parts of the sodium salt of a paraffinsulfonic acid ($C_{12}$ to $C_{18}$), 0.3 parts of potassium persulfate, 0.3 part of sodium bicarbonate and 0.15 part of sodium pyrophosphate. After the polymerization has been initiated, a mixture of 40 parts of butyl acrylate and 32 parts of butadiene is added within five hours. After all of the monomers have been added, the polymerization mixture is kept at 65° C. for another two hours while stirring. An about 40% aqueous dispersion is thus obtained.

*Polymer II*

187.5 parts of the dispersion of polymer I is polymerized with 23 parts of styrene and 10 parts of acrylonitrile, 0.1 part of lauroyl peroxide, 0.05 part of potassium persulfate and 50 parts of water at 65° C. while stirring. An about 40% polymer dispersion is obtained.

*Polymer III*

Polymer III is prepared as described in Example 2.

The product obtained has a notched impact strength of 12.6 cm. kg./sq. cm. and a softening point of 98° C.

EXAMPLE 6

*Polymer I*

5 parts of vinyl isobutyl ether, 11 parts of butyl acrylate and 8 parts of butadiene are polymerized at 65° C. while stirring in 150 parts of water with an addition of 1.2 parts of the sodium salt of a paraffinsulfonic acid ($C_{12}$ to $C_{18}$), 0.3 part of potassium persulfate, 0.3 part of sodium bicarbonate and 0.15 part of sodium pyrophosphate, and a mixture of 46 parts of butyl acrylate and 30 parts of butadiene added within five hours. After all the monomers have been added, the polymerization mixture is kept at 65° C. for two hours while stirring. An about 40% dispersion is obtained.

*Polymer II*

Polymer II is prepared as described in Example 5. The polymer dispersion obtained is precipitated with twice its volume of a 1.5% calcium chloride solution and the product separated and dried.

*Polymer III*

35 parts of polymer II is mixed with 65 parts of a copolymer of styrene and acrylonitrile (72:28) having a K-value of 68 to 70 and processed at about 220° C. in a screw extruder. A product is obtained having a notched impact strength of 21.4 cm. kg./sq. cm. and a softening point of 96° C.

We claim:
1. A process for the production of an impact-resistant thermoplastic composition wherein:
  (a) a rubbery copolymer I is prepared from:
    (A) 30 to 77% by weight of an alkyl acrylate selected from the group consisting of butyl acrylate and ethylhexyl acrylate;
    (B) 20 to 40% by weight of butadiene; and
    (C) 3 to 30% by weight of a vinyl alkyl ether having one to eight carbon atoms in the alkyl radical, the sum of the percentages being 100, by polymerization of the monomers in aqueous emulsion;
  (b) 10 to 50% by weight (with reference to the copolymer I) of monomers selected from the group consisting of styrene and mixtures of styrene and acrylonitrile containing up to 30% by weight of acrylonitrile is added to copolymer I and the resultant mixture is polymerized in emulsion to form component II; and
  (c) component II is mixed with a 60:40 to 90:10 styrene/acrylonitrile copolymer III so that 10 to 35% by weight with reference to the total weight of the composition of copolymer I is contained in the composition.

2. An impact-resistant synthetic thermoplastic product comprising a homogeneous mixture of the components:
  (I) a copolymer II obtained by graft polymerization of a graft monomer selected from the group consisting of styrene and mixtures of styrene and acrylonitrile, said mixture of styrene and acrylonitrile containing up to 30% by weight of acrylonitrile onto the rubbery copolymer I of
    (A) 30 to 77% by weight of an alkyl acrylate selected from the group consisting of butyl acrylate and ethylhexyl acrylate;
    (B) 20 to 40% by weight of butadiene; and
    (C) 3 to 30% by weight of a vinyl alkyl ether having one to eight carbon atoms in the alkyl radical, the sum of the percentages being 100, said graft monomers being combined in the resulting graft copolymer II in an amount of 10 to 50% by weight with reference to the ungrafted rubbery copolymer I and (II) a 60:40 to 90:10% by weight copolymer of styrene and acrylonitrile, said rubber-like copolymer I being present in an amount of 10 to 35% by weight with reference to the total weight of said homogeneous mixture.

No references cited.

MURRAY TILLMAN, *Primary Examiner.*
G. F. LESMES, *Assistant Examiner.*